United States Patent
Zywno et al.

(10) Patent No.: US 12,174,748 B1
(45) Date of Patent: Dec. 24, 2024

(54) SYSTEMS AND METHODS FOR TRANSLATING MEMORY ADDRESSES

(71) Applicant: ADTRAN, INC., Huntsville, AL (US)

(72) Inventors: Cory Zywno, Huntsville, AL (US);
Spencer Gass, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 18/223,394

(22) Filed: Jul. 18, 2023

(51) Int. Cl.
*G06F 12/00* (2006.01)
*G06F 12/0802* (2016.01)
*G06F 12/10* (2016.01)

(52) U.S. Cl.
CPC .......... *G06F 12/10* (2013.01); *G06F 12/0802* (2013.01); *G06F 2212/1024* (2013.01); *G06F 2212/2532* (2013.01)

(58) Field of Classification Search
CPC ................. G06F 12/10; G06F 12/0802; G06F 2212/1024; G06F 2212/261
See application file for complete search history.

(56) References Cited

U.S. PATENT DOCUMENTS

| | | | |
|---|---|---|---|
| 5,247,645 A | 9/1993 | Mirza et al. | |
| 8,072,463 B1 * | 12/2011 | Van Dyke | G06F 12/0607 345/568 |
| 10,044,646 B1 | 8/2018 | Detwiler | |
| 10,642,733 B1 * | 5/2020 | Hayut | G06F 12/0292 |
| 2013/0311747 A1 | 11/2013 | Kumar et al. | |
| 2015/0089168 A1 | 3/2015 | Kalyanasundharam et al. | |

\* cited by examiner

*Primary Examiner* — John A Lane
(74) *Attorney, Agent, or Firm* — Butler Snow LLP; Jon E. Holland (57) ABSTRACT

A memory system has a memory management unit (MMU) that is configured to receive data for storage into physical memory comprising a plurality of memory devices. The MMU receives a logical memory address and converts the logical memory address into at least one page address associated with data to be written to or read from physical memory. The MMU has an address translation circuit that is configured to translate each page address into a physical memory address. In translating the page address, the MMU employs an integer division operation that does not constrain the size of an arbitration map used to define the physical memory address. Thus, the operation of the memory can be better optimized using circuitry that has relatively low complexity and cost.

18 Claims, 7 Drawing Sheets

SYSTEMS AND METHODS FOR TRANSLATING MEMORY ADDRESSES

RELATED ART

Memory management units (MMUs) are used to manage the storage of data to and retrieval of data from physical memory by translating logical memory addresses, sometimes referred to as "virtual addresses," used by a central processing unit (CPU) or other type of processor, to physical memory addresses that identify the physical memory locations where the associated data is to be stored. For example, a memory management unit may be used in a telecommunication switch (e.g., an Ethernet switch) that receives bursts of data from one or more telecommunication lines. When a data burst is received by the switch, a memory system containing an MMU may temporarily store the data burst in physical memory before the data is forwarded from the switch. Memory systems and MMUs may be used in many other applications as well.

The physical memory managed by an MMU often includes multiple memory devices (e.g., "chips"), and it is desirable for the MMU to control memory operations in an efficient manner that enhances the performance of the memory system. As an example, to help prevent bottlenecks in writing data from a data burst in the physical memory, it is generally desirable for the data to be distributed across the memory devices.

For example, if the processing rates of the memory devices are about the same, it may be desirable for data to be evenly distributed among the physical memory devices so that each memory device processes (e.g., stores) about the same amount of data over a given time frame. Otherwise, some of the memory devices may be overutilized while others of the memory devices are underutilized resulting in delays whereby one or more underutilized memory devices may be required to wait on a memory device being overutilized.

Although optimization of processing speed and minimizing latency are important design considerations, there are many other considerations in the design of MMUs. For example, increasing the complexity of an algorithm for translating logical memory addresses in order to provide faster processing rates may help to improve performance but undesirably increase the complexity and costs of the MMU circuitry. Thus, in designing an MMU, tradeoffs often exist between performance optimization and circuitry complexity and costs. MMUs capable of optimizing performance while reducing or limiting circuitry complexity and costs are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for translating logical memory addresses to physical memory addresses. A memory system in accordance with an embodiment of the present disclosure has a memory management unit (MMU) that is configured to receive data and store the received data into physical memory comprising a plurality of memory devices. The MMU separates a group of least significant bits, referred to as the "intra-burst address," of a page address for virtual memory from the remaining most significant bits, referred to as the "intermediate address," and an integer divider divides the intermediate address by an integer corresponding to a number of entries in an arbitration map. Based on the intermediate address and the quotient of the division operation, referred to as the "inter-burst address," modulo circuitry determines an arbitration map address that is mapped by the arbitration map to a partition address and bank select identifying a partition of physical memory. The partition address, inter-burst address and intra-burst address are concatenated to form a physical memory address, and a multiplexer selects a memory device for the physical memory address based on the bank select. Thus, the page address is translated to a physical memory address identifying a partition of physical memory.

Using such techniques, translation of page addresses into physical memory addresses can be optimized so that overutilization of one or more memory devices can be reduced or prevented, thereby reducing processing bottlenecks, regardless of the number of memory devices that may be used. Further, the foregoing can be achieved using circuitry of relatively low complexity and cost.

Figure 1:
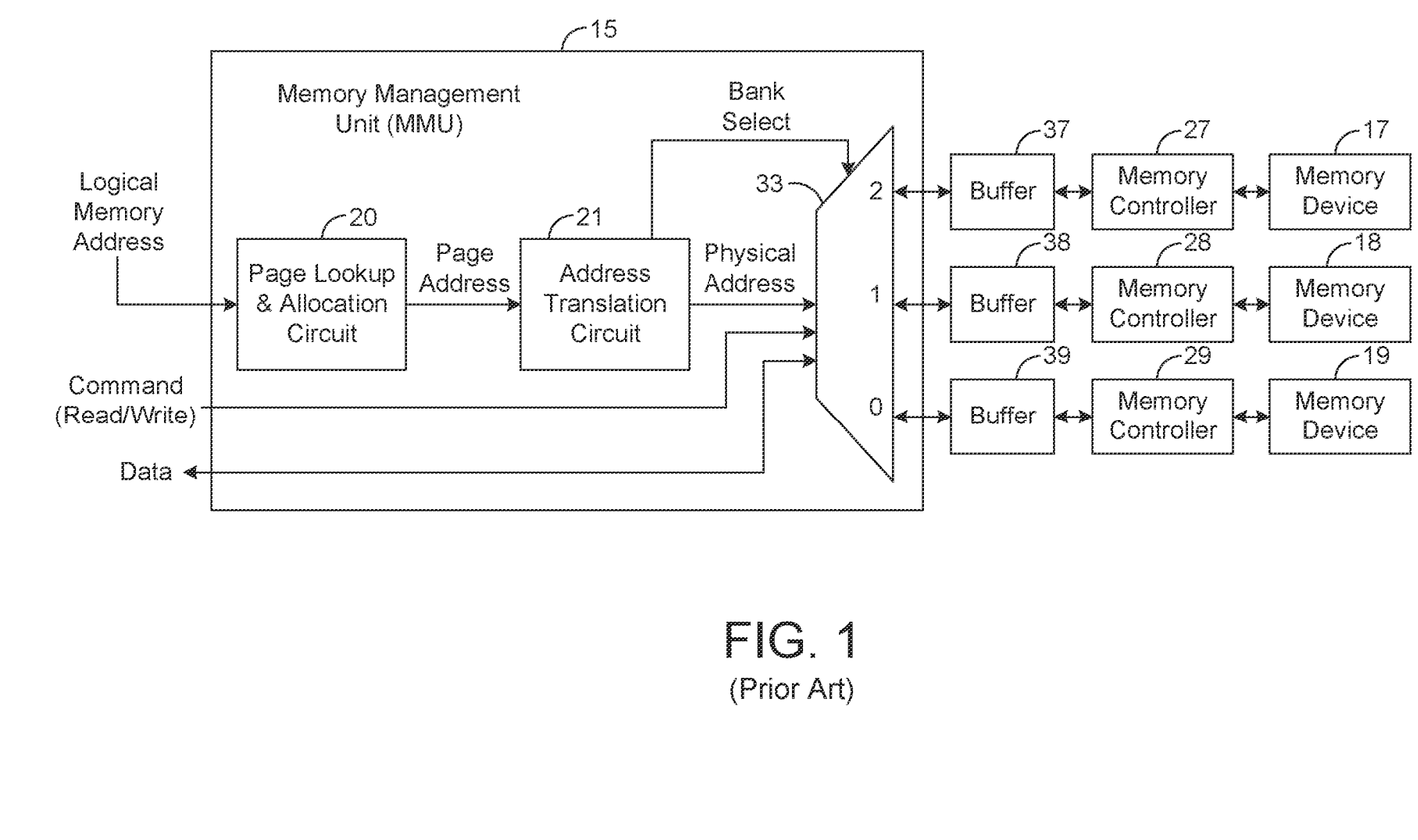
FIG. 1 is a block diagram illustrating a conventional memory system utilizing a memory management unit (MMU).

FIG. 1 depicts a conventional memory system 12 having a conventional memory management unit (MMU) 15 that may be used to translate logical memory addresses (e.g., from a central processing unit (CPU) or other processor) into physical memory addresses identifying physical memory locations in a plurality of memory devices 17-19. In some cases, each memory device 17-19 may be implemented as an integrated circuit, sometimes referred to as a "memory chip."

Referring to FIG. 1, the MMU 15 is configured to receive a logical memory address along with a read or write command. For a read command, the MMU 15 is configured to communicate with one or more memory controllers 27-29 so that data in physical memory spaces associated with the logical memory address is read from the memory devices 17-19. For a write command, the MMU 15 receives data to be written and is configured to communicate with one or more memory controllers 27-29 so that the data is written to the memory devices 17-19 in physical memory spaces associated with the logical memory address.

As shown by FIG. 1, the MMU 15 has a page lookup & allocation circuit 20 that is configured to use the logical memory address to lookup or otherwise determine at least one page address identifying a page of virtual memory where data is to be read or written (depending on the type of command received). Each page address has N bits (i.e., 0 to N−1 bits) and is translated by an address translation circuit 21 into a physical memory address identifying memory spaces of physical memory in the memory devices 17-19.

A multiplexer 33 transmits the physical address to a buffer 37-39 connected to the memory device 17-19 through a respective memory controller 27-29 that is to store the associated data (for a write command) or read data (for a read command). In addition to the physical address, the multiplexer 33 also transmits to the buffer information to be used to access the identified address. For example, for a read operation, the multiplexer 33 transmits a read command with the physical address, and for a write operation, the multiplexer 33 transmits a write command along with the data to be written.

The memory controller 27-29 connected to such buffer 37-39 is configured to pull the physical address or otherwise receive the physical address from the buffer 37-39 and access (e.g., read from or write to) the memory locations identified by the physical address. As an example, if data is to be written to the memory device 17, the multiplexer 33 transmits the physical address (along with a write command and data to be written) to the buffer 37 connected to the memory device 17, and the memory controller 27 connected between the memory device 17 and its respective buffer 37 uses such physical address to store the associated data at the memory locations of the memory device 17 identified by the physical address.

In some embodiments, the MMU 15 is implemented in a telecommunication switch (e.g., an Ethernet switch) that receives bursts of data from a telecommunication line. Such bursts of data may be stored in the memory devices 17-19 at least temporarily before being forwarded from the switch. In other embodiments, the MMU 15 may be implemented in other types of devices and manages the storage of other types of data.

Figure 2:
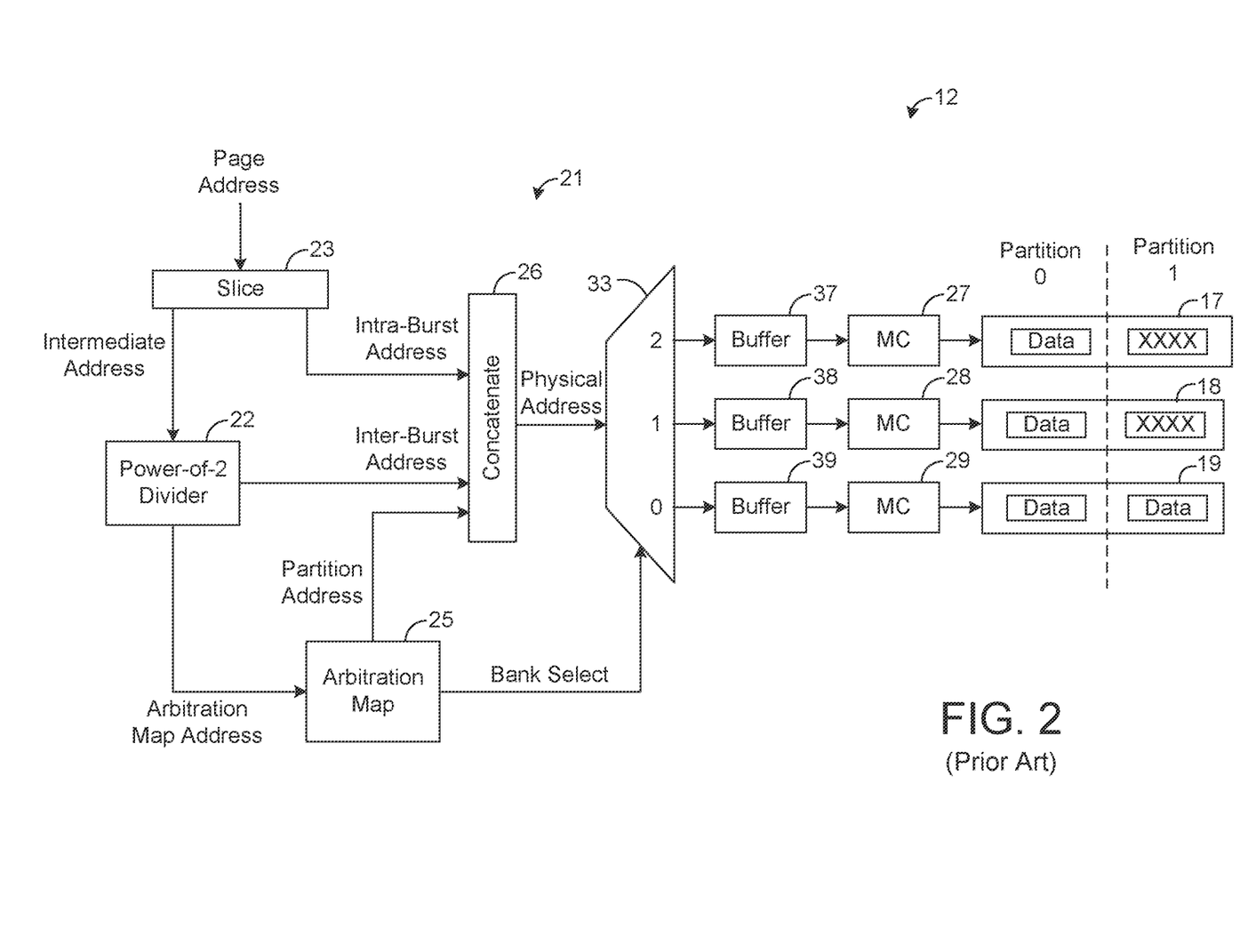
FIG. 2 is a block diagram illustrating the memory system of FIG. 1 with a page lookup & allocation circuit removed to show greater detail of an address translation circuit of the MMU.

FIG. 2 shows an embodiment of a conventional memory system 12 with the page lookup & allocation circuit 20 removed to show greater detail of the address translation circuit 21. As a burst of data is received, pages are allocated by the page lookup & allocation circuit 20, and each page has a plurality of consecutive page addresses identifying virtual memory locations of the allocated page. The address translation circuit 21 translates the page addresses within each allocated page so that data from a data burst to be stored in the respective page is distributed across the memory devices 17-19 in an efficient manner. For example, for a set of consecutive page addresses associated with data words to be stored to the memory devices 17-19, the page addresses are generally translated such that a first group (i.e., one or more) of page addresses are mapped to a partition of a first memory device 19, the next consecutive group of page addresses are mapped to a partition of a second memory device 18, and the next consecutive group of page addresses are mapped to a third memory device 17.

To enhance efficiency, it is generally desirable for a data burst to be distributed across the memory devices 17-19 so that the data burdens are efficiently shared by the memory devices 17-19 and data can be processed at a faster rate. Overutilization generally refers to a condition where too much data is inefficiently assigned to at least one memory device 17-19 relative to its processing speed such that a bottleneck occurs causing delays in storing data to other memory devices. To better illustrate the foregoing, a typical operation of the address translation circuit 21 will be described in more detail below.

Referring to FIG. 2, a page address (which may be a binary string) is sliced at a slice element 23 to separate it into two portions, referred to as "intra-burst address" and "intermediate address." In some embodiments, the slice element 23 may refer to an area where the wires carrying the page address diverge to route the intra-burst address to one system component and the intermediate address to another system component. The intra-burst address represents some number of the least significant bits of the page address. The intra-burst address includes a number (B) of least significant bits [B−1:0] of the page address [N−1:0]. In one embodiment, B is equal to 3 such that there are three bits [2:0] in the intra-burst address, but other number of least significant bits may be used in other embodiments. This intra-burst address generally controls the number of words that may be sent to a given memory device 17-19 before a new memory device 17-19 is selected. Specifically, if the page addresses arrive consecutively, then a given memory device 17-19 will have up to 28 words sent to it before another memory device 17-19 is selected for the next word.

The intermediate address comprises the remaining most significant bits of the page address after the intra-burst address has been separated or removed. If there are B bits (i.e., bits 0 through B−1) in the intra-burst address, then there are N−B bits (i.e., bits B through N−1 or, in other words, [N−1: B]) in the intermediate address. Note that it is possible for the intra-burst address to have any number of bits and also for the intermediate address to have any number of bits.

Referring to FIG. 2, the intermediate address is received by a power-of-2 divider 22, which is configured to divide the intermediate address by a power-of-2 value (i.e., $2^n$, where n is any positive integer). The quotient of this division operation, referred to as the "inter-burst address," is output by the power-of-2 divider 22 and concatenated at a concatenate element 26 with the intra-burst address and a partition address from an arbitration map 25 to form a physical memory address, as will be described in more detail below. In some embodiments, the concatenate element 26 may refer to an area where the wires carrying the information to be buffered converge for routing such information to the multiplexer 33.

Note that, for an arbitration map 25 of size S (i.e., the number of entries addressing partitions of physical memory), the minimum number of bits (M) needed for the arbitration map address is related to S by Equation (1) below for the address translation circuit 21.

$$M = \lceil \log_2(S) \rceil \qquad (1)$$

The inter-burst address [N−1: B+M] may have a number of bits equal to N−B−M.

The remainder [M+B−1: B], also referred to as "modulo," of the division operation performed by the power-of-2 divider 22 is output to the arbitration map 25, which uses the modulo as an arbitration map address to identify an entry of the arbitration map 25. In this regard, the arbitration map 25 is configured to receive the modulo and map the received modulo to an entry identifying a partition of physical memory where the data associated with the received page address is to be stored (for a write command) or where data is to be retrieved (for a read command). Specifically, based on the arbitration map address (which is the modulo from the division operation performed by the power-of-2 divider 22), the arbitration map 25 provides (1) a value, referred to as "bank select," to a multiplexer 33 and (2) a partition address to be concatenated with the intra-burst address and the inter-burst to form a physical memory address input to the multiplexer 33. Note that the partition address may have Q bits [Q−1:0] where $Q=\lceil \log_2(P) \rceil$ where P is the number of partitions per memory device.

The multiplexer 33 is configured to use the bank select to select the memory device 17-19 that is to store or retrieve data. In this regard, the multiplexer 33 is configured to receive the physical memory address (comprising the intra-burst address from the page address, the inter-burst address from the power-of-2 divider 22, and the partition address from the arbitration map 25) and transmit the physical memory address to the buffer 37-39 connected to the memory device 17-19 associated with the bank select from the arbitration map 25. The memory controller 27-29 connected to such buffer is configured to receive the physical address and access the memory location identified by the physical memory address. For example, for a write command, the memory controller 27-29 is configured to store the data associated with the physical address in the selected memory device 17-19 at the memory location identified by the physical memory address from the multiplexer 33. For a read command, the memory controller 27-29 is configured to read data the identified memory location from the selected memory device 17-19.

In the system 12 shown by FIG. 2, the circuitry used to implement the power-of-2 divider 22 may have relatively low complexity and cost since it only performs a divide by a power-of-2 operation. In this regard, a divide by a power-of-2 operation can be performed on a binary value by simply removing a number of least significant bits depending on the desired power-of-2 divisor. The least significant bits that are removed forms the modulo, and the remaining string of most significant bits defines the quotient. However, using such an operation to perform the division also has the result of limiting the range of entries stored in the arbitration map 25. Specifically, the total number of entries (and, thus, addressable memory partitions) is limited to the size of the modulo output from the power-of-2 divider 22 and, thus, is limited to power-of-2 values (i.e., $2^n$ where n is any positive integer). Thus, the number of memory devices 17-19 that can be fully utilized for memory storage may be limited. Specifically, the limitations on the size of the arbitration map 25 may result in underutilization or overutilization of at least some of the available physical memory, thereby increasing latency in at least some situations, as will be described in more detail below.

Figure 3:
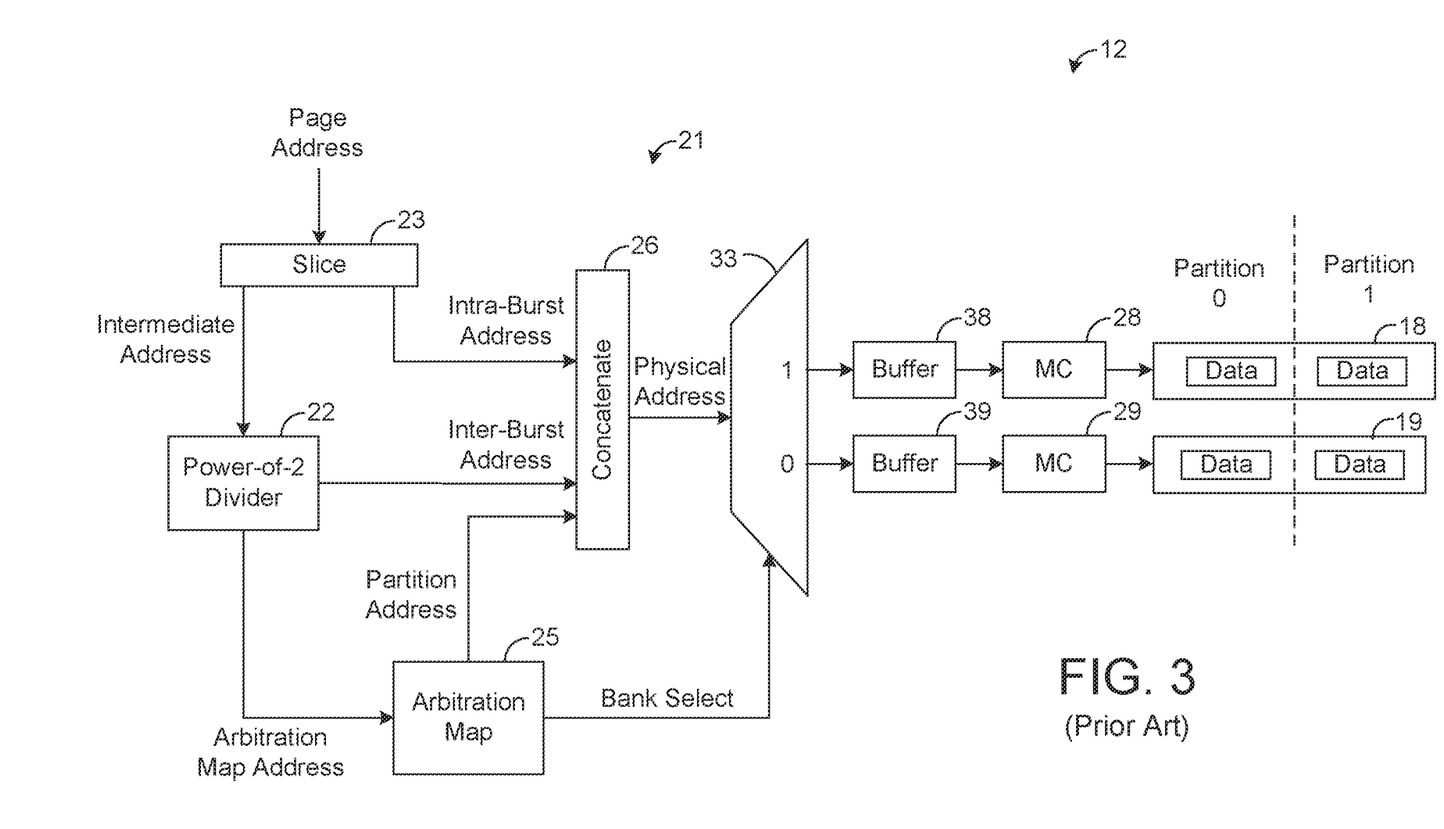
FIG. 3 is a block diagram illustrating the memory system of FIG. 2 with fewer memory devices for data storage.

To better illustrate the foregoing, assume that only two memory devices 18 and 19 are available for the storage of data bursts received by the MMU 15, as shown by FIG. 3. Also assume for simplicity of illustration that each memory device 18 and 19 has two partitions (designated as 0 and 1 in each memory device) at which data may be stored, though in actuality each memory device typically has many more partitions. Since the total number of available memory devices 18 and 19 is a power-of-two value (i.e., 2 in this example), the total partitions available for storage is also a power-of-two value (i.e., 4 in this example), and it is possible for utilization of each memory device 18 and 19 to be about the same as data is received (assuming the processing rates of both memory devices 18 and 19 are about the same). For example, it is possible to distribute data evenly across the available memory devices 18 and 19 so that each memory device 18, 19 performs about the same amount of processing, thereby reducing the occurrences of bottlenecks.

Now consider a case for which there are three memory devices 17-19 for storage of the data, as shown by FIG. 2, noting that three is not a power-of-2 value. In such case, the number of entries of the arbitration map 25 is still limited to four but there are six available partitions. In such an embodiment, two of the partitions (e.g., partition 1 of memory device 17 and partition 1 of memory device 18) are not addressable by the arbitration map 25 and thus may not be used to store data. In such an embodiment, the memory device 19 may be overutilized relative to the other memory devices 17 and 18. Specifically, since the memory device 19 has more addressable memory partitions, it may be instructed to process more data. In the embodiment of FIG. 2 where the memory device 19 has twice as many addressable memory spaces as the memory devices 17 and 18, the memory device 19 may be written to approximately twice as much as each of the other two memory devices 17 and 18. Such overutilization may result in increased latency by which data writes to the underutilized memory devices 17 and 18 may be forced to wait on completion of data writes to the overutilized memory device 19. That is, the overutilized memory device 19 may create a bottleneck that results in processing delays.

Note that the above example assumes that each memory device 17-19 processes (e.g., stores) data at the same rate. However, it is possible for one or more of the memory devices 17-19 to process data at a different rate relative to one or more other memory devices 17-19. The data may be mapped to the memory devices 17-19 such that more data is stored to memory devices 17-19 capable of processing data at a faster rate. For example, if memory device 19 has a processing rate twice as fast (2×) as the rates of the memory devices 17 and 18, then the mappings can be controlled such that memory device 19 is visited twice as often. That is, as described above for FIG. 2, twice as much data may be mapped to the memory device 19 relative to the other memory devices 17 and 18. Further, since the processing rate of memory device 19 is twice as fast in the current example, no overutilization or underutilization occurs (i.e., no bottleneck results). However, this is not necessarily the case for other processing speed ratios. For example, if all of the memory devices 17-19 have the same processing rate, as described above, or if the other memory devices 17 and 18 can only run at 33% the speed of memory device 19, then overutilization may result. Depending on the respective rates of the memory devices 17-19, it can be difficult or impossible to find a power-of-2 size of the arbitration map 15 that avoids overutilization or underutilization of at least one memory device 17-19.

Figure 4:
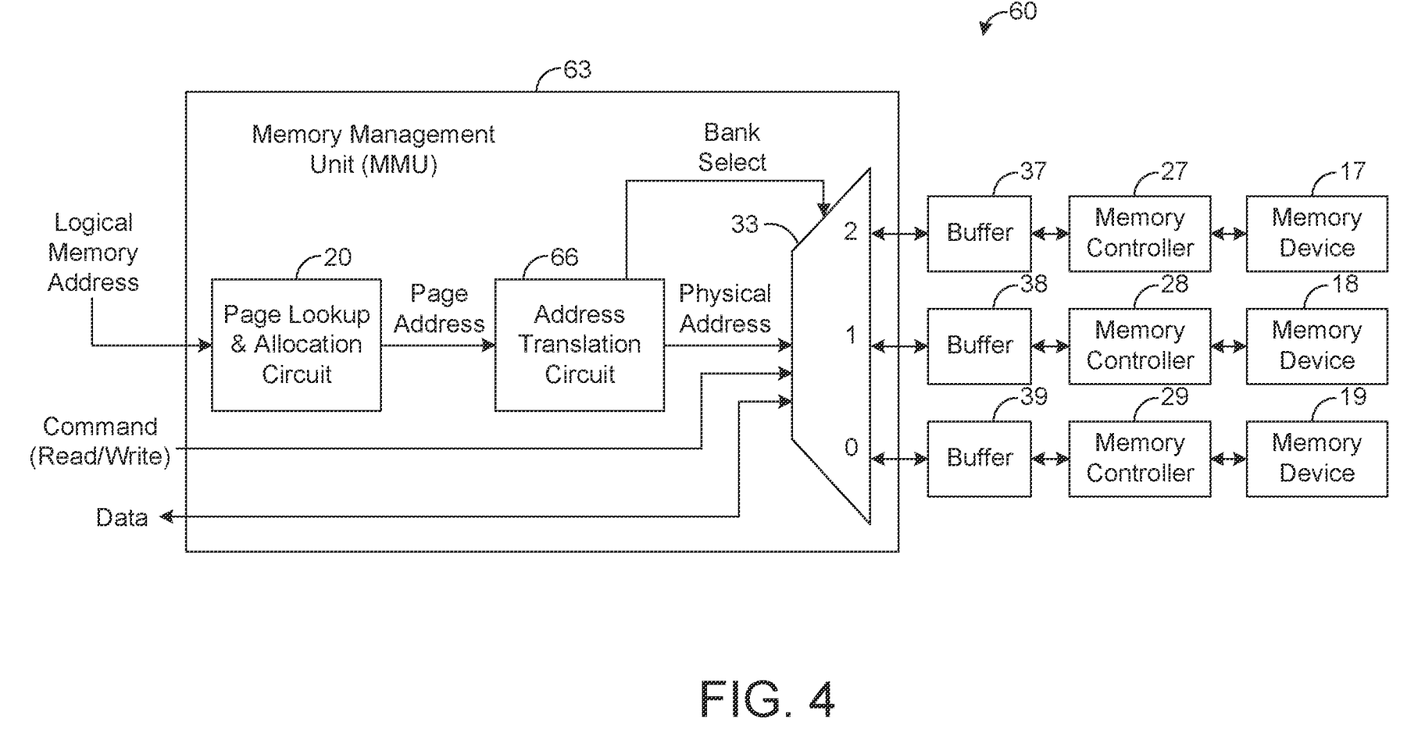
FIG. 4 is a block diagram illustrating an exemplary embodiment of a memory system utilizing an MMU.

FIG. 4 depicts a memory system 60 having an MMU 63 for translating logical memory addresses into physical memory addresses. Except as otherwise described below, the configuration and operation of the system 60 may be similar to that described above for the system 12. As shown by FIG. 4, the MMU 63 has an address translation circuit 66 that may be used in place of the conventional address translation circuit 21 shown by FIG. 2.

Figure 5:
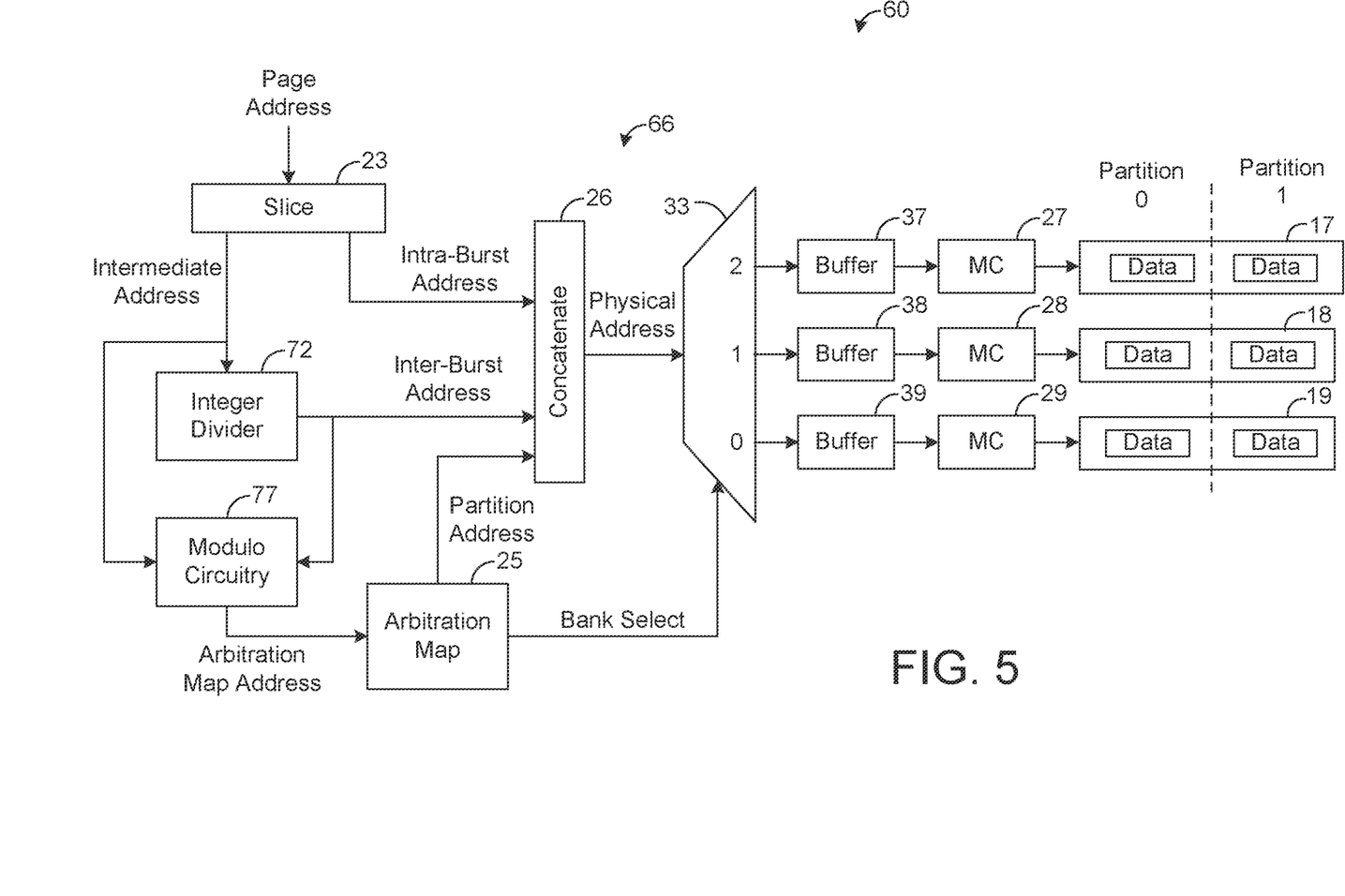
FIG. 5 is a block diagram illustrating the memory system of FIG. 4 with a page lookup & allocation circuit removed to show greater detail of an address translation circuit of the MMU depicted by FIG. 4.

FIG. 5 shows an embodiment of the memory system 60 with the page lookup & allocation circuit 20 removed to show greater details of an address translation circuit 66 of the MMU 63. As shown by FIG. 5, a page address received by the address translation circuit 66 is separated at slice element 23 into two portions, the "intra-burst address" and "intermediate address," as described above for the conventional system 12. In addition, the intermediate address is received by an integer divider 72, which is configured to divide the intermediate address by an integer. However, unlike the power-of-2 divider 22 of FIG. 2, which is configured to divide by a power-of-2 value, the divider 72 may be configured to divide the intermediate address by any positive integer, as may be desired. The quotient of this division operation, referred to as the "inter-burst address," is output by the integer divider 72 and concatenated with the intra-burst address and a partition address from the arbitration map 25 to form a physical memory address, as will be described in more detail below.

As shown by FIG. 5, the intermediate address and the inter-burst address are provided to modulo circuitry 77, which uses such input to determine an arbitration map address that may be used to lookup or otherwise identify an entry of the arbitration map 25 indicating the physical address to be used to store or retrieve data, as will be described in more detail below. The arbitration map address may have a range equal to the arbitration map size (e.g., from 0 to the arbitration map size−1).

The arbitration map 25 is configured to map the received arbitration map address to an address identifying a respective partition in a respective memory device 17-19 where the data associated with the received page address is to be stored or where data is to be retrieved. Specifically, from the map entry correlated with the received arbitration map address, the arbitration map 25 provides a value, referred to as "bank select," and a partition address. The bank select is received by the multiplexer 33, which is configured to use the bank select to select the memory device 17-19 that is to store or retrieve data. In this regard, as described above for the conventional system 12 of FIG. 1, the multiplexer 33 is configured to receive the physical address (comprising the intra-burst address from the page address, the inter-burst address from the power-of-2 divider 22, and the partition address from the arbitration map 25) and transmit the physical address to the buffer 37-39 connected to the memory device 17-19 associated with the bank select from the arbitration map 25 (i.e., the selected memory device 17-19). The memory controller 27-29 connected between such buffer and the selected memory device 17-19 then stores (for a write command) the data associated with the page address in the memory device 17-19 at the location identified by the physical memory address from the multiplexer 33. For example, if the bank select indicates memory device 17, then the physical memory address is transmitted to the buffer 37, and the memory controller 27 stores the data in the memory device 17 at the physical memory location identified by the physical address. For a read command, the aforementioned memory controller 27-29 retrieves data from the selected memory device 17-19 at the location identified by the physical memory address from the multiplexer 33.

Notably, the size of the arbitration map 25 (e.g., number of entries corresponding to memory partitions in the memory devices 17-19) is not constrained by the operation performed by the integer divider 72. That is, the maximum number of entries of the arbitration map 25 is not a power-of-2 value but rather may be any positive integer. Thus, the arbitration map 25 may include an entry for any desired number of memory partitions (e.g., each available memory partition) irrespective of the number of memory devices 17-19 used. As an example, in the embodiment shown by FIG. 5 where there are three memory devices 17-19 with each memory device 17-19 having two partitions, it is possible to distribute data across the memory devices 17-19 such that the processing burden of each memory device 17-19 over a given time frame is about the same. Thus, assuming that each memory device 17-19 is able to process data at about the same rate, it is possible to evenly distribute data across the memory devices 17-19 such that there should be no bottlenecks occurring from overutilization or underutilization of one or more memory devices 17-19, as described above for the conventional system 12.

In addition, in several examples described above, it is assumed that each of the memory devices 17-19 has the same capacity and processing rate for storing data. There may be times, such as when at least one of the memory devices 17-19 has a higher processing rate than the others, when the address translation circuit 21 can be configured to distribute data bursts across the memory devices 17-19 in an uneven manner without causing bottlenecks. Specifically, more data may be distributed to the memory devices capable of faster processing relative to the other memory devices having slower processing rates. The use of the integer division operation by integer divider 72 provides greater flexibility to the size of the arbitration map 25 so that any desired number of the memory partitions are addressable and the translations of page addresses to physical memory devices can be performed in any desirable manner for preventing bottlenecks from underutilization or overutilization of memory devices 17-19.

Figure 6:
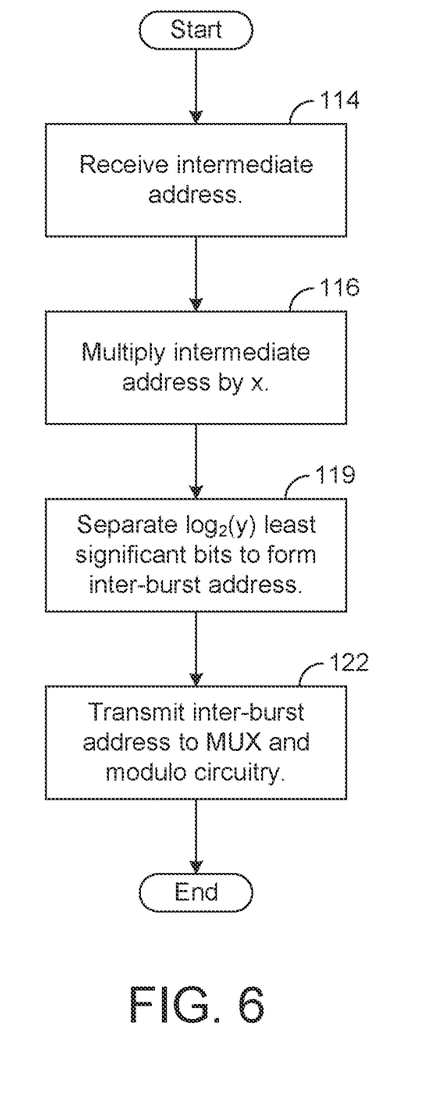
FIG. 6 is a flow chart illustrating an exemplary division operation for dividing an intermediate address by an integer using an algorithm that is based on multiplication.

In addition, the circuitry of the integer divider 72 and the modulo circuitry 77 may be implemented in such a way so as to provide relatively low complexity and costs. For example, the integer divider 72 may be configured to implement an algorithm that is based on multiplication. The goal of this algorithm is to closely approximate the division by multiplying by a fraction 1/S, where as noted above S is a value representing the size of the arbitration map 25 (i.e., the number of entries addressing partitions of physical memory). To accomplish this multiplication operation, two values (x and y) may be found such that x/y is very close to 1/S and y is a power-of-2 value. To approximate 1/S, the integer divider 72 may be configured to receive the intermediate address, as shown by block 114 of FIG. 6, and multiply the received intermediate address by x, thereby providing a result, z, as shown by block 116 of FIG. 6. The integer divider 72 may then separate a number of least significant bits (which represent the inter-burst address to be provided to the multiplexer 33) from the remaining most significant bits of the binary value z (where such remaining most significant bits represent the inter-burst address to be provided to the modulo circuitry 77), as shown by block 119 of FIG. 6. The number of least significant bits separated from the remaining most significant bits may be equal to log (y).

Note that the magnitude of x and y may be tuned for the size of the logical address space. By selecting larger values for x and y, it is possible to get closer and closer to approximating the target fraction and thereby reduce error. The values of x and y are preferably selected such that x/y is sufficiently close to 1/S so any error in the division over the required address range is isolated to the fractional portion of the quotient, which is truncated. The fractional component is effectively recovered by the modulo operation performed by modulo circuitry 77 in a form that allows for addressing of a non-power-of-2 sized arbitration map without error. After performing block 119, the integer divider 72 may transmit the inter-burst address to the multiplexer (MUX) 33 and the modulo circuitry 77, as shown by block 122 of FIG. 6.

Figure 7:
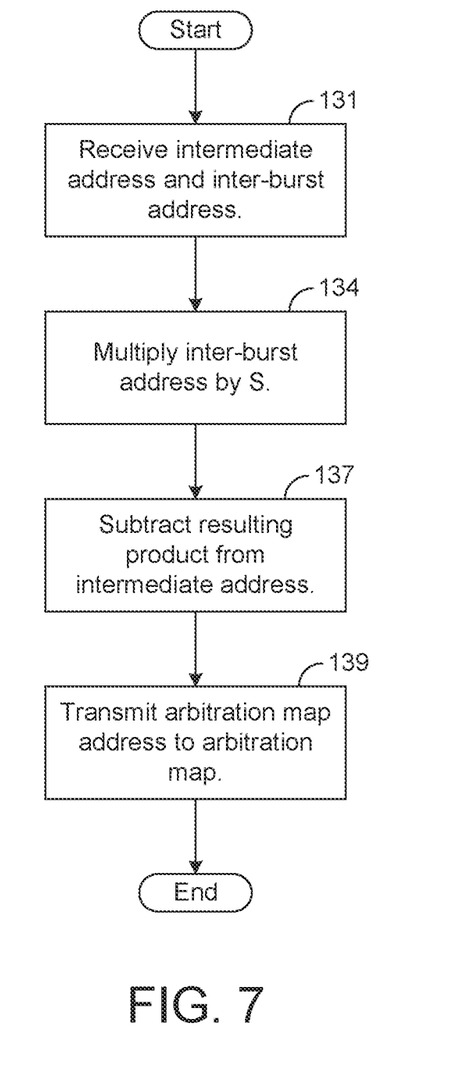
FIG. 7 is a flow chart illustrating an exemplary operation for calculating the modulo of the division operation illustrated in FIG. 5 using an algorithm that is based on multiplication.

The modulo circuitry 77 may also be configured to implement an algorithm that is based on multiplication. In this regard, the modulo circuitry 77 may be configured to receive the inter-burst address, as shown by block 131 of FIG. 7, and multiply the inter-burst address by S, as shown by block 134 of FIG. 7, where S is a value representing the size of the arbitration map 25 as noted above (and may be the same value determined above for finding x and y used by the integer divider 72). The modulo circuitry 77 may then subtract the resulting product from the intermediate address to provide the arbitration map address, as shown by block 137 of FIG. 7, and the modulo circuitry 77 may then transmit the arbitration map address to the arbitration map 25, as shown by block 139 of FIG. 7. In other embodiments, other algorithms for implementing the integer divider 72 or the modulo circuitry 77 are possible.

In some embodiments, the address translation circuit 21 (including the integer divider 72 and the modulo circuitry 77) is implemented in a field programmable gate array (FPGA), although other configurations of the address translation circuit 21 are possible. Note that the page lookup & allocation circuit 20 may similarly be implemented within an FPGA, although other configurations of the page lookup & allocation circuit 20 are possible. The exemplary algorithms described above for the divider 72 and the module circuitry 77 are well suited for implementation within an FPGA (as well as other types of circuitry) with relatively little complexity and cost.

In various embodiments described above, the MMU 63 is described in the context of writing data to the memory devices 17-19. It should be noted that the MMU 63 may translate page address in the same way for reading data from the memory devices 17-19, as may be desired.

The invention claimed is:

1. A system for translating page addresses into physical memory addresses, comprising:
   a plurality of buffers;
   a plurality of memory controllers;
   a plurality of memory devices; and
   a memory management unit having an address translation circuit, the address translation circuit comprising an integer divider, modulo circuitry, an arbitration map, and a multiplexer, the address translation circuit configured to receive a page address associated with data to be stored or retrieved and separate the page address into (1) an intermediate address comprising a plurality of most significant bits of the page address and (2) an intra-burst address comprising a plurality of least significant bits of the page address, wherein:
   the integer divider is configured to receive the intermediate address and to perform an operation for dividing the intermediate address by an integer to provide an inter-burst address;
   the modulo circuitry is configured to receive the inter-burst address and the intermediate address and to calculate, based on the inter-burst address and the intermediate address, an arbitration map address corresponding to a modulo of the operation performed by the integer divider;
   the arbitration map is configured to map the arbitration map address to a bank select and a partition address;
   the address translation circuit is configured to concatenate the intra-burst address, the inter-burst address, and the partition address to a form a physical memory address;
   the multiplexer is configured to transmit the physical memory address to one of the plurality of buffers based on the bank select; and
   one of the memory controllers is configured to receive the physical address from the one of the plurality of buffers and to access a memory location in one of the plurality of memory devices identified by the physical memory address.

2. The system of claim 1, wherein the integer is not a power-of-two value.

3. The system of claim 2, wherein the integer corresponds to a size of the arbitration map.

4. The system of claim 1, wherein the integer divider is configured to perform the operation by multiplying the intermediate address by a predefined value to form a product and separate a plurality of least significant bits of the product from a plurality of most significant bits of the product, and wherein the plurality of most significant bits of the product forms the inter-burst address.

5. The system of claim 1, wherein the modulo circuitry is configured to multiply the inter-burst address by a predefined value to form a product and subtract the product from the intermediate address.

6. The system of claim 5, wherein the predefined value corresponds to a size of the arbitration map.

7. An address translation circuit for use in a memory management unit to translate a page address into a physical memory address for accessing a memory location, the page address defining (1) an intermediate address comprising a plurality of most significant bits of the page address and (2) an intra-burst address comprising a plurality of least significant bits of the page address, the address translation circuit comprising:
   an integer divider configured to receive the intermediate address and to perform an operation for dividing the intermediate address by an integer to provide an inter-burst address;
   modulo circuitry configured to receive the inter-burst address and the intermediate address and to calculate, based on the inter-burst address and the intermediate address, an arbitration map address corresponding to a modulo of the operation performed by the integer divider;
   an arbitration map configured to map the arbitration map address to a bank select and a partition address, wherein the address translation circuit is configured to concatenate the intra-burst address, the inter-burst address, and the partition address to a form a physical memory address; and
   a multiplexer configured to transmit the physical memory address to one of the plurality of buffers based on the bank select.

8. The address translation circuit of claim 7, wherein the integer is not a power-of-two value.

9. The address translation circuit of claim 8, wherein the integer corresponds to a size of the arbitration map.

10. The address translation circuit of claim 7, wherein the integer divider is configured to perform the operation by multiplying the intermediate address by a predefined value to form a product and separate a plurality of least significant bits of the product from a plurality of most significant bits of the product, and wherein the plurality of most significant bits of the product forms the inter-burst address.

11. The address translation circuit of claim 7, wherein the modulo circuitry is configured to multiply the inter-burst address by a predefined value to form a product and subtract the product from the intermediate address.

12. The address translation circuit of claim 11, wherein the predefined value corresponds to a size of the arbitration map.

13. A method for translating page addresses into physical memory addresses, comprising:
- receiving, with a memory management unit, a page address associated with data to be stored;
- separating the page address into (1) an intermediate address comprising a plurality of most significant bits of the page address and (2) an intra-burst address comprising a plurality of least significant bits of the page address;
- dividing, with an integer divider of the memory management unit, the intermediate address by an integer to provide an inter-burst address;
- receiving, with modulo circuitry of the memory management unit, the inter-burst address and the intermediate address;
- calculating, with the modulo circuitry based on the inter-burst address and the intermediate address, an arbitration map address corresponding to a modulo resulting from the dividing;
- mapping, with an arbitration map of the memory management unit, the arbitration map address to a bank select and a partition address;
- concatenating, with the memory management unit, the intra-burst address, the inter-burst address, and the partition address to a form a physical memory address;
- transmitting the physical memory address to one of the plurality of memory devices based on the bank select; and
- storing the data at a memory location in the one of the plurality of memory devices identified by the physical memory address.

14. The method of claim 13, wherein the integer is not a power-of-two value.

15. The method of claim 14, wherein the integer corresponds to a size of the arbitration map.

16. The method of claim 13, wherein the dividing comprises:
- multiplying the intermediate address by a predefined value to form a product; and
- separating a plurality of least significant bits of the product from a plurality of most significant bits of the product, wherein the plurality of most significant bits of the product forms the inter-burst address.

17. The method of claim 13, wherein the calculating comprises:
- multiplying the inter-burst address by a predefined value to form a product; and
- subtracting the product from the intermediate address.

18. The method of claim 17, wherein the predefined value corresponds to a size of the arbitration map.

* * * * *